United States Patent Office 3,423,366
Patented Jan. 21, 1969

3,423,366
COMPOSITION COMPRISING: (1) A BIS ESTER OF AN AROMATIC TETRACARBOXYLIC ACID, (2) AN INERT ORGANIC SOLVENT, (3) MELAMINE, AND (4) AN AROMATIC DIAMINE
Ralph E. De Brunner, Kettering, and John K. Fincke, Spring Valley, Ohio, assignors to Monsanto Research Corporation, St. Louis, Mo., a corporation of Delaware
No Drawing. Filed June 30, 1966, Ser. No. 561,756
U.S. Cl. 260—65                  8 Claims
Int. Cl. C08g 20/00, 20/32

ABSTRACT OF THE DISCLOSURE

A composition comprising: (1) a bis(hydroxyalkyl) or bis(hydrocarbyloxyalkyl) ester of an aromatic tetracarboxylic acid, (2) an inert organic solvent, (3) melamine, and (4) an aromatic diamine; said composition providing a heat-curable resin useful as a coating, impregnating or adhesive agent.

---

This invention relates to coating and laminating compositions and more particularly to certain new and valuable cross-linked nitrogenous polyesters of the polyimide type.

In my copending applications Ser. Nos. 561,755 and 581,667, filed on June 30, 1966 and July 19, 1966 respectively, there are disclosed the bis(hydroxyalkyl) and the bis(hydrocarbyloxyalkyl) esters of aromatic tetracarboxylic acids and polyamide/carboxylates prepared therefrom by reaction with organic diamines. Thus, in said copending applications there are disclosed esters of the formula $$HO-\overset{O}{\underset{\|}{C}}-R-\overset{O}{\underset{\|}{C}}-OH$$
$$(O=\overset{|}{C}-O\text{-alk-}OY)_2$$

wherein R is a tetravalent aromatic radical of from 6 to 24 carbon atoms, is free of olefinic and acetylenic unsaturation and of substituents which react with the amine radical in preference to a radical containing the $$-\overset{O}{\underset{\|}{C}}-$$

linkage, and wherein one pair of the radicals $$-\overset{O}{\underset{\|}{C}}-OH$$

and $$-\overset{O}{\underset{\|}{C}}-O\text{-alky-}OY$$

is positioned at a first pair of non-tertiary nuclear carbon atoms which are immediately consecutive and wherein the other pair of the radicals $$-\overset{O}{\underset{\|}{C}}-OH \text{ and } -\overset{O}{\underset{\|}{C}}-O\text{-alk-}OY$$

is positioned at a second pair of non-tertiary nuclear carbon atoms which are immediately consecutive, said second pair being separated from said first pair by at least one carbon atom; alk denotes an alkylene radical having from 2 to 4 carbon atoms in the chain and a total of from 2 to 6 carbon atoms; and Y is hydrogen or a hydrocarbyl radical free of olefinic and acetylenic unsaturation and containing from 1 to 8 carbon atoms.

Said copending applications also provide varnishes suitable for use as coating compositions and as impregnating agents in the preparation of composites, said varnishes comprising solutions prepared by contacting the above ester with a diamine of the formula $H_2N-Z-NH_2$ wherein Z is an aromatic radical having from 6 to 18 carbon atoms and being free of olefinic and acetylenic unsaturation and of substituents which react with the carboxy radical more readily than does the amine radical, in an organic solvent for the ester. Drying and heating of the varnishes up to a temperature of say, about 150° C., causes the ester to condense with the diamine to form a polyamide/carboxylate, thus:

$$HO-\overset{O}{\underset{\|}{C}}-R-\overset{O}{\underset{\|}{C}}-OH + H_2N-Z-NH_2 \xrightarrow{-H_2O}$$
$$(O=\overset{|}{C}-O\text{-alk-}OY)_2$$

$$\left[ -Z-\overset{H}{\underset{|}{N}}-\overset{O}{\underset{\|}{C}}-R-\overset{O}{\underset{\|}{C}}-\overset{H}{\underset{|}{N}}- \right]$$
$$(O=\overset{|}{C}-O\text{-alk-}OY)_2$$

wherein alk, R, Y, and Z are as above defined, and n denotes the degree of polymerization.

Continued heating, say, at up to about 500° C., and preferably up to 350° C., results in liberation of a glycol, HO-alk-OR or a hydroxy ether, to HO-alk-O-alk- with intramolecular cyclization to the polyimide:

$$\left[ -Z-N \underset{\underset{\|}{C}}{\overset{\overset{\|}{C}}{\diagdown}} \underset{\underset{O}{\|}}{\overset{O}{\|}} R \underset{\underset{\|}{C}}{\overset{\overset{\|}{C}}{\diagdown}} \underset{\underset{O}{\|}}{\overset{O}{\|}} N- \right]_n$$

The glycol or ether is volatilized at a steady rate during the curing; hence, bubble-formation such as that encountered with sporadically or suddenly evolved by-product is minimized. Moreover, when a hydroxy ether is retained in the cured product, it serves to plasticize it.

Advantageously, the bis(hydroxyalkyl) or bis(hydrocarbyloxyalkyl) esters which are condensed with the diamine in preparing the above polyamide/carboxylates are obtained by reacting an appropriate aromatic tetracarboxylic acid or the dianhydride thereof with an appropriate alkylene glycol or mono-ether thereof. Even though an excess of the said glycol or mono-ether is used, complete esterification is not obtained. However, the excess does serve as a convenient and very efficient solvent for the esterification and for the polyamide-forming reaction.

Although the polyimides are known to possess a degree of resistance to heat and solvents which exceeds that of many other polymeric materials, nevertheless, for numerous applications even greater stability to heat is desirable. Retention of strength characteristics even after prolonged exposure in air to temperatures which are substantially over, say, 500° F. is required of many materials of construction in present day technology.

Now we have found that polymeric materials having improved thermal stability are obtained by contacting the bis(hydroxy-alkyl) or the bis(hydrocarbyloxyalkyl) esters of the aromatic tetracarboxylic acids with a mixture of the aromatic diamine and melamine, instead of only with the diamine. For the preparation of a liquid product, i.e., a varnish or syrup, suitable as coating, impregnating and adhesive agents and as a coating resin, the bis-ester is simply mixed with the diamine and the melamine in the presence of an inert, organic solvent for said ester. Conveniently, the solvent is the glycol or the glycol monoether which corresponds to the alcohol moiety of the ester because, as disclosed above, it can be incorporated with the ester by simply employing an excess thereof in preparing the bis-ester from the tetracarboxylic acid or its dianhydride and the glycol or the glycol mono-ether.

When the bis-ester is mixed with the aromatic diamine in the absence of melamine, there is generally observed no evolution of heat. Replacement of even a very small quantity of the diamine with melamine, however, is accompanied by a rise in temperature. Nevertheless, the solution remains clear. Hence, at this point, there may be only a salt-forming reaction between the melamine and the free carboxy radicals of the bis-ester. Because in the absence of melamine the formation of the polyamide/carboxylate from the bis-ester and the aromatic diamine generally requires application of heat, there is no reason to suppose that the heat evolution noted upon mixing of the bis-ester, the diamine and the melamine stems from a premature participation of the melamine in the polyamide/carboxylate forming reaction. Heating of the solution at a temperature of below about 150° C. results in volatilization of the solvent and the formation of a solid, polymeric material, as is the case when the melamine-free solutions are similarly heated. Also, subsequent heating or curing of the solid polymers at above about 150° C. up and preferably to about 350° C. increases the heat-stability of the polymers as in formation of the polyimides from prior polyamide/carboxylates. However, the flexural strength and modulus of the cured products obtained from the diamine/melamine mixtures are not so much affected by prolonged heating as are those of products obtained in the same manner from the same bis-esters and the same diamines in absence of the melamine. Although in general, the flexural strength of a cured product obtained from the melamine-free mixtures is initially higher than that obtained from the melamine-containing mixture, after aging at about the maximum curing temperature the flexural strength of that obtained from the melamine-containing mixture is higher than that of the product prepared in absence of the melamine. The flexural modulus of both types of products are initially substantially the same and remain of the same order upon aging at about the maximum curing temperature. Whether the difference in the heat-susceptibility of the cured polymers stems from participation of the melamine in a cross-linking reaction or whether it be due to the effect of the heterocyclic triazine nucleus in the polymer chain can only be speculated. However, for the production of varnishes which are useful as impregnating agents in preparing B-staged plies or prepegs for laminate use wherein there are desired readily soluble varnishes and laminates which possess very good flexural strength and flexural modulus after prolonged heating in air at temperatures which are substantially above 300° C., there should be employed the bis(hydroxyalkyl) and/or the bis(hydrocarbyloxyalkyl) tetracarboxylates, together with both the diamine and the melamine.

The molar ratio of the bis-ester to the total amine which is required to give useful impregnating and coating varnishes or casting syrups is advantageously maintained within rather narrow limits, i.e., one mole of the bis-ester is employed with a total of from about 0.8 to 1.2 moles of diamine and melamine, the quantity of melamine being from about 2 to 100 mole percent, the molar ratio of diamine to melamine being from 1:1 to 1:0.02.

The present invention thus provides heat-reactive liquid mixtures or varnishes prepared by mixing together: (I) an ester of the formula:

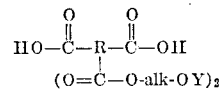

wherein R, Y and alk are as defined above; (II) an inert organic solvent for said ester; (III) melamine and (IV) a diamine of the formula H$_2$N—Z—NH$_2$, wherein Z is an aromatic radical of from 6 to 18 carbon atoms and free of olefinic and acetylenic unsaturation and of substituents which react with the carboxy radical more readily than with the amine radical; and wherein there is employed per mole of said ester a total of from about 0.8 to 1.2 moles of diamine and melamine, the molar ratio of diamine to melamine being from 1:1 to 1:0.02 and preferably of from 1:0.3 to 1:0.08.

The invention also provides the method of fabricating laminate structures which comprises depositing said varnish upon a substrate, drying and heating the substrate together with its deposit at a temperature of up to about 150° C. to obtain a deposit of solid polymer upon the substrate, arranging plies of the resulting substrate in a stack, and pressing the stack, preferably at a temperature of from about 150° C. up to about 350° C. to obtain a laminate unit.

The invention also provides a method of coating the surface of a substrate which comprises depositing said varnish on said surface, and drying and heating the substrate together with its deposit at a temperature of about 150° C. when the intended application of coated surface does not involve exposure to above 150° C. or heating the coated substrate to from about 150° C. up to about 500° C. when the coated substrate is to be exposed to such higher temperatures.

Still another embodiment of the invention comprises the provision of compression molded objects by heating the varnish to a temperature of below 150° C. to volatilize the solvent and to obtain a solid polymer, and then compression molding the finely comminuted polymer at a temperature of about 150° C. to up to about 500° C. to obtain a shaped object.

The bis(hydroxyalkyl) or the bis(hydrocarbyloxyalkyl) esters of aromatic tetracarboxylic acids which are employed with the aromatic diamine and the melamine in the preparation of the presently provided varnishes include, for example, the bis(2-hydroxyethyl), the bis(3-hydroxypropyl), the bis(4-hydroxybutyl), the bis(2-hydroxy-1-methylethyl), the bis(2,3-dimethyl-3-hydroxypropyl), the 2-hydroxyethyl 3-hydroxylpropyl, the bis(2-methoxy-, ethoxy-, propoxy-, butoxy, hexyloxy- or octyloxyethyl), the bis(4-methoxy- or propoxybutyl), bis(4-ethoxy- or methoxypropyl), the bis (2-ethyl-2-methyl-3-pentylpropyl), the bis(2-phenoxyethyl), the bis(4 - phenoxybutyl), the 2 - methoxyethyl 3 - phenoxypropyl, the bis(3-o-, m- or p-tolyloxypropyl)-, bis[2-(p-hexylphenoxy)ethyl], 2-p-tolyloxyethyl 4-hydroxybutyl, or the bis(3-cyclopentyloxypropyl) esters of the aromatic tetracarboxylic acids, generally, so long as such acids are free of non-benzenoid unsaturation and of substituents which react with an amine radical more readily than does the carboxy group and so long as the carboxy and carboxylate radicals are positioned as described above, such as 1,2,4,5-benzenetetracarboxylic acid;
1,4,5,8-naphthalenetetracarboxylic acid;
4-nitro-1,2,5,6-naphthalenetetracarboxylic acid;
3,3',4,4'-biphenyltetracarboxylic acid;
2,2'-dimethoxy-3,3',4,4'-biphenyltetracarboxylic,
2,2',3,3'-biphenyltetracarboxylic acid;
3,6-dimethoxy-1,2,4,5-benzenetetracarboxylic acid;
2,2',5,5'-tetramethyl-3,3',4,4'-biphenyltetracarboxylic acid;
3,4,9,10-perylenetetracarboxylic acid;
4,4'-isopropylidenediphthalic acid;
1,8,9,10-phenanthrenetetracarboxylic acid;
4,4'-carbonyldiphthalic acid;
4,4'-[2,2,2-trifluoro-1-(trifluoromethyl)]-ethylidenediphthalic acid;
4,4'-oxydiphthalic acid;
4,4'-sulfonyldiphthalic acid;
2,2'-dichloro-3,3',4,4'-biphenyltetracarboxylic acid;

etc. Presently preferred are the bis(hydroxyalkyl) and the bis(hydrocarbyloxyalkyl) esters of 4,4′-carbonyldiphthalic acid; i.e., compounds of the structure

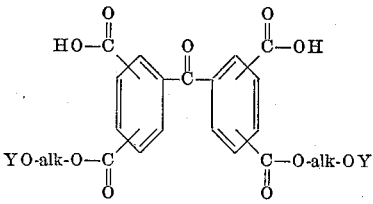

An ester of two or more different hydroxy compounds and the aromatic tetracarboxylic acid may be used, e.g., there may be employed mixed esters obtained by esterifying one of the four carboxylic groups with one glycol or one hydroxy ether and then esterifying another carboxylic group with a different glycol or hydroxy ether or by esterifying one of the carboxylic groups with a glycol and the other with a hydroxy ether.

The diamine with which the bis-ester and the melamine is employed may be any aromatic diamine which has from 6 to 18 carbon atoms and which is free of non-benzenoid unsaturation and of substituents which react with the carboxy radical more readily than does the amine radical, e.g., 4,4′-oxydianiline, o-, m- or p-phenylenediamine, benzidine, 3,3′-dimethoxybenzidine, 1,8 - naphthalenediamine, 4,4′ - sulfonyloxydianiline, 4,4′-methylenedianiline, 4,4′ - methylene - bis(3-nitroaniline), 4,4′-ethylidenedianiline, 2,3,5,6-tetramethyl-p-phenylenediamine, 4,4′-oxybis(2,2′-propylaniline), etc.

Two or more different diamines or two or more different bis-esters may be used as the respective amine and carboxylic reactants; e.g., a mixture of an amine such as benzidine and 4,4′-oxydianiline or p-phenylenediamine and 1,8-naphthalenediamine may be reacted with a single carboxylic component such as bis(2-hydroxyethyl) or bis-(2-ethoxyethyl) 1,2,4,5-benzenetetracarboxylate or bis-(3-hydroxypropyl) or bis(4-hydroxybutyl) 4,4′-carbonyldiphthalate or with a mixture of carboxylates such as a mixture of bis (3 - propoxybutyl) 4,4′ - isopropylidenediphthalate and bis(2-methoxyethyl) 3,4,9,10-perylenetetracarboxylate or a mixture of bis(2-hydroxyethyl) 4,4′-carbonyldiphthalate and bis(2,3-dimethyl-4-phenoxybutyl) 4,4′-carbonyldiphthalate. Thereby there are obtained polymers having different linkages dispersed more or less randomly in the polymer molecule. Such an expedient is useful in tailoring polymer structures having properties intermediate to those attributable to the individual linkages.

Preparation of the presently provided varnishes is carried out by mixing together the melamine, the ester and solvent for the ester. Because the bis(hydroxyalkyl) and the bis(hydrocarbyloxyalkyl) esters are readily soluble, provision of a solvent for this purpose presents no problem. If an excess of the alkylene glycol or of the mono-ether thereof has been employed for esterifying the tetracarboxylic dianhydride in preparing the bis-ester, the excess can conveniently serve as solvent in the varnish. Also, if desired, to any excess of the glycol or ether which is present in the esterification product, there may be added one or more other solvents, e.g., a lower alcohol or ether such as butanol or propyl ether. When production of the bis(hydroxyalkyl) or bis(hydrocarbyloxyalkyl) esters has been conducted by transesterification, e.g., by reaction of an alkylene glycol or its mono-ether with another diester of the tetracarboxylic acid, there is obtained as by-product a hydroxy compound corresponding to the alcoholic moiety of the starting ester, e.g., a lower alkanol when the starting ester is a dialkyl tetracarboxylate. The by-product hydroxy compound need not be removed from the crude esterification product previous to formulation of the varnish. For example, a dialkyl ester such as dibutyl 4,4′-carbonyldiphthalate is reacted with 2-methoxyethanol to give bis(2-methoxyethyl) 4,4′-carbonyldiphthalate together with butanol as by-product. Without removing the butanol, the reaction mixture is mixed with the melamine and the diamine to give the varnish. In the transesterification reaction as well as in esterification of the free tetracarboxylic acid or dianhydride thereof, an excess of the alkylene glycol or the mono-ether is conveniently used for providing for proper esterification and for serving as solvent in the varnish.

Depending upon the quantity of alkylene glycol or mono-ether used, the reaction mixture may be used directly as a coating or impregnating agent. However, if the esterification reaction mixture is too fluid for the intended application, some of the solvent may be removed partially or even entirely by volatilization at ordinary pressure or by evacuation. Either the fluid concentrate obtained by removing only part of the solvent, or the solvent-free residue may be used for the preparation of laminates or other composites. The conversion to the polymer is conducted after the varnish or concentrate has been applied to the substrate.

Curing of the polymer is conducted by heating either in air or in an inert atmosphere which may be, e.g., nitrogen, argon, or vacuum. Temperatures of from, say, above 150° C. and preferably up to about 350° C. are useful.

In the preparation of a laminate, plies of a material of construction, e.g., of an inorganic textile such as glass cloth or of a textile of silica, carbon or metal are coated or impregnated with the varnish and heated under pressure. Depending upon the extent of heating, the matrix of the resulting composite will consist essentially of either the uncured polymer or the cured polymer. Advantageously, the varnish is applied to the substrate and "B"-staging, i.e., conversion to the uncured polymer, is conducted by heating the substrate with its deposit at below about 150° C. before stacking to a laminate structure. The stack is then compression molded at a temperature of above 150° C. and below about 350° C. at a pressure of, say, from about 10 p.s.i. to 10,000 p.s.i. to obtain the cured laminate. Plies of glass, metal, plastics and ceramics are thus tenaciously bonded together. Other composites may be similarly prepared, employing with the varnishes filaments or textiles of glass, metal, silica, graphite, etc. Finely comminuted reinforcing materials or fillers, which may be in microballoon form, may be incorporated with the varnish to form a mobile mass which can be formed while curing.

In coating applications, the varnish is brushed or sprayed upon the substrate, the diluent or solvent is evaporated and the substrate, with its deposit of dried coating is heated at a temperature of below about 150° C. to effect preliminary polymerization and then at a temperature of above 150° C. and up to about 500° C. to cure the coating for conversion to a polymer of increased resistance to heat and solvents.

The curing temperature will depend upon such conditions as time and atmosphere, as well as upon the substrate in the case of laminates and coatings. Generally, a lower curing temperature will require longer curing time. In experimental runs, the coated substrate will be maintained at the maximum temperature permitted by the substrate for a time of about a few minutes to several hours in order to assure completion of curing. This point can be readily ascertained in experimental runs by noting substantial cessation in weight change.

A very convenient method of operation involves preparing a bis(hydroxyalkyl) or a bis(hydrocarbyloxyalkyl) ester of the aromatic tetracarboxylic acid by reacting the acid, or preferably its dianhydride, with the alkylene glycol or its mono-ether, using an excess thereof as a solvent to obtain a solution of the bis-ester in the glycol or ether, mixing the solution with the appropriate diamine, and using the resulting mixture or varnish for application as a coating to a substrate, as an impregnating agent in the preparation of laminates or other composites, or for casting into a film. Conversion to the polymer is effected in situ.

The invention is further illustrated by, but not limited to, the following examples.

EXAMPLE 1

A mixture consisting of 492.1 g. (7.9 moles) of ethylene glycol and 322.2 g. (1 mole) of 4,4'-carbonyldiphthalic dianhydride was heated to 100° C. during a period of 1 hour to give a clear solution of bis(2-hydroxyethyl)4,4'-carbonyldiphthalate in the glycol. After the solution had been allowed to cool to 35° C., 97.3 g. (0.9 mole) of m-phenylenediamine and 8.4 g. (0.08 mole) of finely comminuted melamine were added, with stirring, and stirring was continued until all the solids had been dissolved. A temperature rise of 6° C. was noted, indicating some reaction of the ester with the amine.

Glass fiber textile (S994 glass, 181 style, heat-cleaned) was dipped into the solution, drained and dried. "B"-staging, i.e., pre-curing to effect a preliminary polymerization was conducted by heating the dried cloth for 90 minutes at 120° C. In order to determine suitability of the "B"-staged cloth for laminating purposes, a sample thereof was heated at 225° C. for 10 minutes. From the difference in loss in weight before and after the 225° C. heating there was determined a resin content of 36.5% and volatiles content of 6.5% in the "B"-staged cloth.

A 12-ply laminate was prepared from 8″ squares of the "B"-staged cloth, pressing for 45 minutes at 260° C./50 p.s.i. The average resin content of the hard, clear laminate thus obtained was determined to be 31.5% from the weight difference between the pressed laminate and the weight of the bare cloth. Determination of the resin content from the weight difference of test specimens before and after burning off all resin at 599° C. for a minimum of 12 hours gave a value of 31.0%. The thickness of the laminate varied from 0.123″ to 0.128″ and it possessed a Barcol hardness of 54 to 55. Determination of the flexural strength and the flexural modulus of four flexural specimens gave an average value of about 42,200 p.s.i. and 2,900,000 p.s.i., respectively.

Post-curing of five flexural specimens by heating them for 2 hours at each of the temperatures 200°, 225°, 250°, 300°, 325° and 350° C. and for 4 hours at 372° C. gave average values of 35,700 p.s.i. and 2,700,000 p.s.i. for flexural strength and modulus, respectively. The post-cured specimens were remarkably stable to subsequent heating. Thus, after 100 hours at 371° C., the average values determined for the five specimens at 371° C. were found to be about 29,000 p.s.i. and about 2,700,000 p.s.i., for flexural strength and flexural modulus, respectively.

EXAMPLE 2

To 740.7 g. (5.4 moles) of β-phenoxyethanol there was slowly added, with stirring, 322.2 g. (1 mole) of 4,4'-carbonyldiphthalic dianhydride, and the whole was heated to 110° C. in order to obtain thorough solution. To the resulting reaction mixture, comprising a solution of the bis(2-phenoxyethyl) ester of 4,4'-carbonyldiphthalic acid, there was added 87.6 g. (0.8 mole) of m-phenylenediamine and 16.8 g. (0.16 mole) of powdered melamine. Stirring resulted in a slight exothermic reaction to give homogenous varnish. Use of the varnish for impregnating glass textile as described in Example 1, with "B"-staging and laminate molding and post-curing being conducted as in that example, gave strong-, well-bonded laminate which substantially retained its good mechanical properties upon subsequent aging at 371° C. for 100 hours.

EXAMPLE 3

Operating as in Example 1, 2-methoxyethanol was reacted with 4,4'-carbonyldiphthalic dianhydride to give a solution of the bis(2-methoxyethyl) ester of 4,4'-carbonyldiphthalic acid in 2-methoxyethanol. To the resulting solution there was then added 86.4 g. (0.8 mole) of p-phenylenediamine and 34.3 g. (0.2 mole) of melamine and the resulting reaction mixture was applied to glass textile and dried. "B"-staging, compression molding, and post-curing, as in Example 1, gave tough laminates which exhibited very good thermal stability; i.e., the laminates possessed very good flexural strength even after long heating at about 371° C.

Although, for purposes of comparison, the above examples are limited to 2-hydroxyethyl, the 2-methoxyethyl, and the 2-phenoxyethyl esters of 4,4'-dicarbonylphthalic acid as the ester component and to mixtures of melamine and m-phenylenediamine as the amine components of the varnishes, other bis(hydroxyalkyl) or bis(hydrocarbyloxyalkyl) esters and other diamines are likewise useful; thus, there may be prepared and employed the bis(3-hydroxypropyl) or the bis(3- or 4-phenoxybutyl) ester of 4,4'-carbonyldiphthalic acid or 1,2,4,5-benzenetetracarboxylic acid or of other tetracarboxylic acids, e.g., 4,4'-isopropylidenediphthalic acid or 2,3,6,7-naphthalenetetracarboxylic acid and instead of the m-phenylenediamine there may be used benzidine or 1,8-naphthalenediamine or 4,4'-oxydianiline or 4,4'-sulfonyldianiline. The solvent may or may not be the alkylene glycol or the hydroxy-ether from which the bis-ester is derived. For example, instead of employing an excess of 2-methoxyethanol for preparing the bis(2-methoxyethyl) ester of 4,4'-carbonyldiphthalic acid as in the above examples, the ester may be prepared by employing in the reaction mixture only the stoichiometrically required quantity of the 2-methoxyethanol in the presence or absence of an inert organic liquid diluent. Subsequently, for the polymer-forming and curing reactions, when an excess of the 2-methoxyethanol has not been used in forming the ester, there may be used such diluents as the lower alcohols and the alkyl ethers.

Obviously, many modifications and variations of the invention may be made without departing from the spirit and scope thereof, and therefore only such limitations should be imposed as are indicated in the appended claims.

What is claimed is:

1. A heat-reactive, liquid mixture obtained by mixing together (I) an ester of the formula

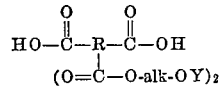

wherein R is a tetravalent aromatic radical of from 6 to 24 carbon atoms, is free of olefinic and acetylenic unsaturation and of substituents which react with the amine radical in preference to a radical containing the

linkage, and wherein one pair of the radicals

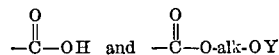

is positioned at a first pair of non-tertiary nuclear carbon atoms which are immediately consecutive and wherein the other pair of the radicals

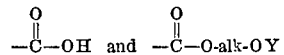

is positioned at a second pair of non-tertiary nuclear carbon atoms which are immediately consecutive, said second pair being separated from said first pair by at least one carbon atom; alk denotes an alkylene radical having from 2 to 4 carbon atoms in the chain and Y is hydrogen or a hydrocarbyl radical free of olefinic and acetylenic unsaturation and containing from 1 to 8 carbon atoms; (II) an inert organic solvent for said ester; (III) melamine and (IV) a diamine of the formula $H_2N$—Z—$NH_2$ wherein Z is an aromatic radical of from 6 to 18 carbon atoms and free of olefinic and acetylenic unsaturation and of substituents which react with the carboxy radical more readily than with the amine radical; and wherein there is employed per mole of said ester a total of from about 0.8 to 1.2 moles of diamine plus melamine, the molar ratio of diamine to melamine being from 1:1 to 1:0.02.

2. The liquid mixture defined in claim 1 further limited in that R is

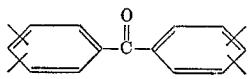

3. The liquid mixture defined in claim 1 further limited in that Y is hydrogen.

4. The liquid mixture defined in claim 1 further limited in that Y is hydrocarbyl containing from 1 to 8 carbon atoms.

5. The liquid mixture defined in claim 1 further limited in that Z is phenylene.

6. The liquid mixture defined in claim 1, further limited in that R is

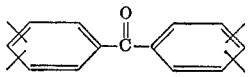

alk is ethylene, Y is hydrogen, and Z is phenylene.

7. The liquid mixture defined in claim 1, further limited in that R is

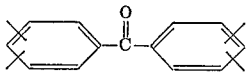

alk is ethylene, Y is methyl, and Z is phenylene.

8. The liquid mixture defined in claim 1, further limited in that R is

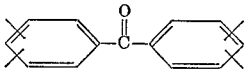

alk is ethylene, Y is phenyl, and Z is phenylene.

References Cited

UNITED STATES PATENTS 3,282,897 11/1966 Angelo _____ 260—47
3,347,808 10/1967 Lavin et al. _____ 260—29.1

WILLIAM H. SHORT, *Primary Examiner.*

L. L. LEE, *Assistant Examiner.*

U.S. Cl. X.R.

260—78, 33.4, 33.2; 117—161; 161—190, 227